United States Patent
Mohanty et al.

(10) Patent No.: US 9,809,702 B2
(45) Date of Patent: Nov. 7, 2017

(54) HYBRID SUSTAINABLE COMPOSITES AND METHODS OF MAKING AND USING THEREOF

(71) Applicant: University of Guelph, Guelph (CA)

(72) Inventors: Amar Mohanty, Guelph (CA); Manjursi Misra, Guelph (CA); Arturo Rodriguez-Uribe, Guelph (CA); Singaravelu Vivekanandhan, Salem (IN)

(*) Notice: Subject to any disclaimer, the term of this patent is extended or adjusted under 35 U.S.C. 154(b) by 0 days.

(21) Appl. No.: 15/022,742

(22) PCT Filed: Sep. 17, 2014

(86) PCT No.: PCT/CA2014/050886
§ 371 (c)(1),
(2) Date: Mar. 17, 2016

(87) PCT Pub. No.: WO2015/039237
PCT Pub. Date: Mar. 26, 2015

(65) Prior Publication Data
US 2016/0229997 A1    Aug. 11, 2016

Related U.S. Application Data

(60) Provisional application No. 61/878,762, filed on Sep. 17, 2013.

(51) Int. Cl.
C08L 23/10    (2006.01)
C08L 25/06    (2006.01)
(Continued)

(52) U.S. Cl.
CPC .......... *C08L 23/14* (2013.01); *B29C 47/0004* (2013.01); *C08L 23/12* (2013.01); *B29C 47/0009* (2013.01); *B29C 47/0083* (2013.01); *B29C 47/0805* (2013.01); *B29C 47/0813* (2013.01); *B29C 47/1081* (2013.01);
(Continued)

(58) Field of Classification Search
CPC ............... C08K 7/02; C08K 3/04; C08L 1/00
See application file for complete search history.

(56) References Cited

FOREIGN PATENT DOCUMENTS

| CN | 103726219 | 4/2014 |
|---|---|---|
| KR | 101062899 | 9/2011 |

OTHER PUBLICATIONS

Machine translation of KR-101062899 B1.*
(Continued)

*Primary Examiner* — Vu A Nguyen
(74) *Attorney, Agent, or Firm* — Eduardo Krupnik

(57) ABSTRACT

Composites containing one or more synthetic plastics, such as thermoplastics, one or more natural materials, such as plant/tree fibers, and biochar and/or torrefied material are described herein. The composite can contain additional additives, such as reinforcing agents and/or fibers, compatibilizers, etc. The composites have improved mechanical and/or physical properties, such as strength, impact strength, rigidity/modulus, heat deflection temperature, moldability/melt flow index, renewability, and lower cost compared to composites that do not contain the biochar and/or torrefied material. The presence of the biochar and/or torrefied material also serves to remove the odor often associated with natural fibers and other additives.

26 Claims, 4 Drawing Sheets

(51) Int. Cl.
- *C08L 27/06* (2006.01)
- *C08K 7/06* (2006.01)
- *C08K 7/14* (2006.01)
- *C08K 11/00* (2006.01)
- *C08L 23/14* (2006.01)
- *C08L 23/12* (2006.01)
- *C08J 5/04* (2006.01)
- *B29K 311/10* (2006.01)
- *B29C 47/00* (2006.01)
- *B29C 47/08* (2006.01)
- *B29C 47/10* (2006.01)
- *B29C 47/40* (2006.01)
- *B29C 47/60* (2006.01)
- *B29C 47/76* (2006.01)
- *B29C 47/82* (2006.01)
- *B29C 47/92* (2006.01)
- *B29K 105/12* (2006.01)

(52) U.S. Cl.
CPC .......... *B29C 47/40* (2013.01); *B29C 47/6012* (2013.01); *B29C 47/767* (2013.01); *B29C 47/822* (2013.01); *B29C 47/92* (2013.01); *B29C 2791/006* (2013.01); *B29C 2947/92019* (2013.01); *B29C 2947/92209* (2013.01); *B29C 2947/92409* (2013.01); *B29C 2947/92704* (2013.01); *B29C 2947/92952* (2013.01); *B29K 2105/12* (2013.01); *B29K 2311/10* (2013.01); *C08J 5/04* (2013.01)

(56) References Cited

OTHER PUBLICATIONS

Ono, Y. et al., Plastic Composite Materials Using Bamboo and Bamboo Charcoal Reinforcement, 71st Annual Technical Conference of the Society . . . , Apr. 2013, p. 1615-1618.

\* cited by examiner

Standard    Hybrid 1    Hybrid 2

HYBRID SUSTAINABLE COMPOSITES AND METHODS OF MAKING AND USING THEREOF

CROSS REFERENCE TO RELATED APPLICATIONS

This application is a national stage application under 35 U.S.C. §371 of International Application No. PCT/CA2014/050886, filed Sep. 17, 2014, which in turn claims the benefit under 35 U.S.C. §119(e) of U.S. Provisional Ser. No. 61/878,762, filed Sep. 17, 2013, the contents of each of which are hereby incorporated by reference into the present disclosure.

FIELD OF THE INVENTION

The present invention is in the field of hybrid sustainable composites, particularly composites containing plant fibers and biochar and/or torrefied materials. The composite materials therein may contain modified and/or treated biochar, plant fibers and/or torrefied materials, various sources of synthetic fibers and/or plastics, synthetic additives and/or fillers.

BACKGROUND OF THE INVENTION

Plant fibers and natural fillers can be obtained from forests, energy crops, agricultural staples, or agricultural residues in more than 1 billion tons annually. Plant fibers are being widely investigated for strengthening synthetic plastics including thermoplastic and thermoset polymers. The properties of plastics reinforced with natural fibers have a similar trend when compared with glass fibers, and therefore, represent an important commercial alternative for the fiber-plastic composites industry.

Fiber-plastic composites can be produced by a variety of techniques including thermoforming, vacuum forming, compression molding, extrusion, and injection molding. Plant fibers can substitute totally or partially glass fibers in many applications, and the cost of plant fibers is substantially less compared to glass fibers. For example, plant fibers cost approximately $US 0.20-0.25/lb while general purpose E-glass fiber costs approximately $US 2.00/lb. Natural fibers, such as dedicated crops (e.g., perennial grasses like miscanthus, switch grass etc.), cost around 10 cents/lb. Similarly, agri-residue natural fibers cost around 10 cents/lb.

The use of plant fibers in fiber plastic composites may have performance limitations. For example, composites containing thermoplastic polymers having dispersed organic reinforcing materials and/or fillers have been investigated. However, it is known by those versed in the art of manufacture of these materials that most plastics and plant fibers are chemically incompatible and are unsuitable for most practical applications.

Therefrom, there exists a need for composite materials, particularly those containing plastics and plant fibers and/or natural fillers, which have improved chemical, physical, and/or mechanical properties.

Therefore, it is an object of the present invention to provide methods of making and using composite materials, including hybrid composites containing plastics and natural fibers (e.g., plant fibers) as well as glass fiber, carbon fibers, or similar fibers, in combination with biochar and/or torrefied materials, which have improved functional performance. Moreover, the biomass source; biochar and/or plant fibers, may be modified chemically or physically or both to improve the interfacial adhesion, that is, silanes leading to the deposition of chemical species, alkaline treatments, and/or physical modifications including maceration and sieving, particle separation and selection, etc. may be applicable.

SUMMARY OF THE INVENTION

Composites containing one or more sources of biomass including natural fibers and/or fillers, synthetic fibers and or fillers, one or more sources of synthetic plastics and one or more additives are described herein. The possibility of sourcing natural fibers and or biochar is illustrated but not limited to Table 1. Materials treated under pyrolysis refer herein either to biochar or torrefied materials. Compositions containing plastics and natural fibers and/or synthetic fibers in combination with biochar and/or torrefied materials have not been described previously. The composite may contain additional additives, such as impact modifiers, compatibilizers, fillers, phenolic antioxidants, etc. In exemplary compositions the composites are hybrid composites molded with natural fibers, biochar and/or torrefied material, glass fiber and/or carbon fiber, other additives, and polyolefins.

The exposed composites show economic, mechanical and/or physical advantages compared to composites that do not contain natural fiber, biochar and/or torrefied material. These may include, but are not limited to the following properties: flexural and tensile strength, impact strength, rigidity/modulus, heat deflection temperature, moldability/melt flow index, renewability, density, and/or cost. The presence of the biochar and/or torrefied material in the herein hybrid composites also serves to remove or reduce the odor often associated with natural fibers in addition to providing certain superior functional performance, low density, renewability and/or lower cost when compared to non-hybrid compositions or compositions lacking plant derived biomass. The removal or reduction of odor is particularly important for plastics used in consumer products requiring high performance as per example, but not limited to, injection molded parts found in the interiors of cars (e.g., console boxes, glove box, dash boards, car pillars, etc.), and other applications including outdoor decking, railings, sidings, roofing, etc.

Furthermore, hybrid compositions explained herein do not necessitate change in the processing parameters at the molder when these substitute hitherto used fossil polymers and can be used in existing molds. Even superior weight advantages can be gained if the wall thickness of the existing parts can be reduced—as for example when introducing a new platform in the auto industry, when new molds are normally made.

The composites described herein are renewable resource-based materials, since the composites contain a high content of plant fibers and/or biomass-based biochar yet demonstrate the necessary physical and/or mechanical properties for the applications listed above.

This development, therefore, includes the following specific topics and specific examples:

a) Hybrid compositions of natural fibers-biochar-plastics-additives-fillers, b) Hybrid compositions of natural fibers-biochar-glass fiber-plastics-additives-fillers, c) Hybrid compositions of natural fibers-biochar-carbon fiber-plastics-additives, d) Hybrid compositions containing glass fiber showing improved general functional properties, e) Hybrid compositions containing carbon fiber showing improved general functional properties, f) Hybrid compositions containing biochar and carbon fiber showing improved general functional properties and the reduction of the overall density of the composites, g) Alternative hybrid compositions containing biochar and carbon fiber to carbon black/talc or calcium carbonate filled plastics, h) Fibrous materials that may be incorporated include, but are not limited to, E-glass, chopped E-Glass, S-glass, aramid fiber, and carbon fibers/recycled carbon fibers, chopped carbon fibers, i) A combination thereof, j) Hybrid compositions containing biochar and/or torrefied material which may be milled, sieved, or classified, or treated to improve dispersion and particle-matrix interaction at the interface, k) Hybrid compositions containing plant fibers which may be used as originally isolated from the plant or treated by physical or chemical methods in order to improve dispersion and/or interaction with the other components in the composite, l) Hybrid compositions targeted to cover specific requirements, but not limited to: tensile strength at yield >27.7 MPa; impact Izod notched energy >56 MPa; Flexural stress and modulus >43.7 and 2200 MPa respectively; heat deflection temperature>120° C.; Melt flow index (MFI) of 20 g/10 min at 230° C./2.16 kg; and density less than 1.000 g/cm$^3$, m) Hybrid compositions targeted to produce materials with high stiffness and to provide material with the following minimal requirements: Tensile strength at yield >32 MPa; Flexural stress >52 MPa; heat deflection temperature (HDT)>130° C.; melt flow index (MFI) of >9 g/10 min at 230° C./2.16 kg; and densities <1.060 g/cm$^3$.

Methods to increase the MFI without decreasing the general mechanical performance of the composites are also provided.

DETAILED DESCRIPTION OF THE INVENTION

I. Definitions

Figure 1:
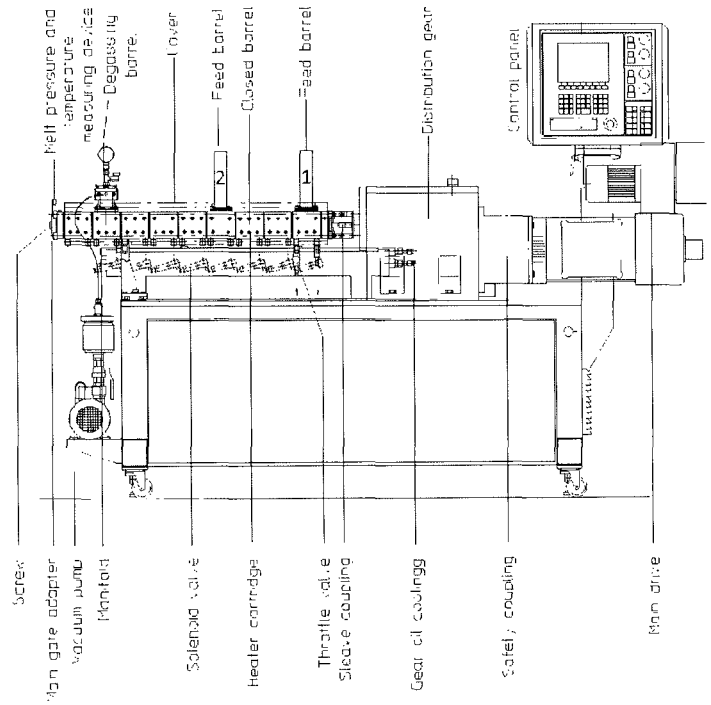
FIG. 1 is a schematic representation of a twin screw extruder used for the fabrication of the biocomposites (obtained from the manual of the Leistritz extruder, type MIC/GL-480 convertible from co- to counter-rotating). Formulations were optimized using bench-top compounding and molding machines. The polymers or solids are premixed with necessary chemicals and fed into the extruder in the first zone (FIG. 1). The temperature of first 3-4 heating zones is kept at higher value to facilitate fast melting of polymers. Functional groups from maleated polymers and from the terpolymers are suitable sites to react with hydroxyl groups abundantly available in the composition of plant fibers/biomass. After the heating zone 4 (FIG. 1), plant fibers premixed with other desired fillers/reinforcements, such as biochar, are fed into the extruder. The temperature profile of heating zone 5 to the die is set at lower values to avoid unnecessary degradation of different components, but high enough to perform the right compounding.
Figure 2:
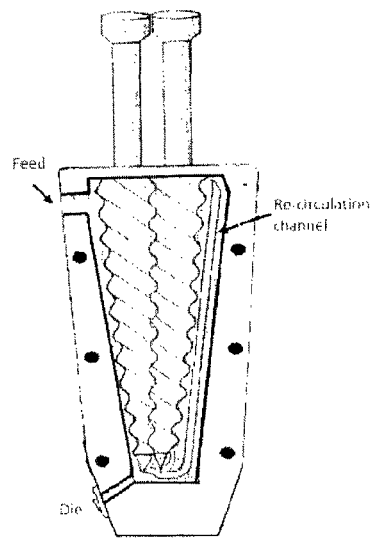
FIG. 2 is a schematic representation of the screw configuration of a micro extrusion chamber.
Figure 3:
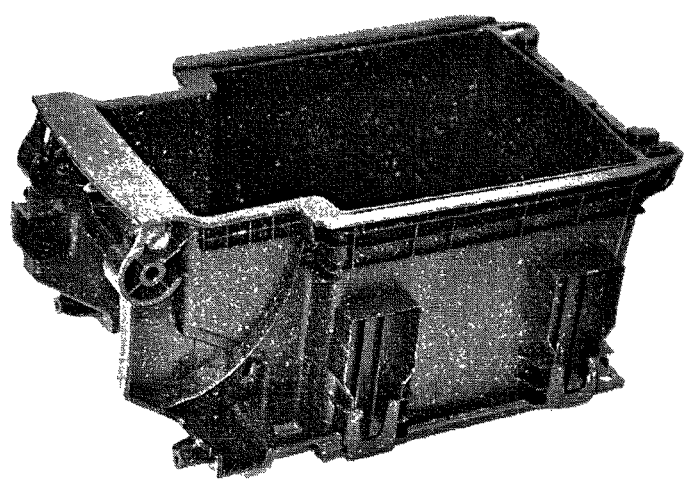
FIGS. 3, 4, and 5 are console box prototypes produced from optimized composite formulations.
Figure 4:
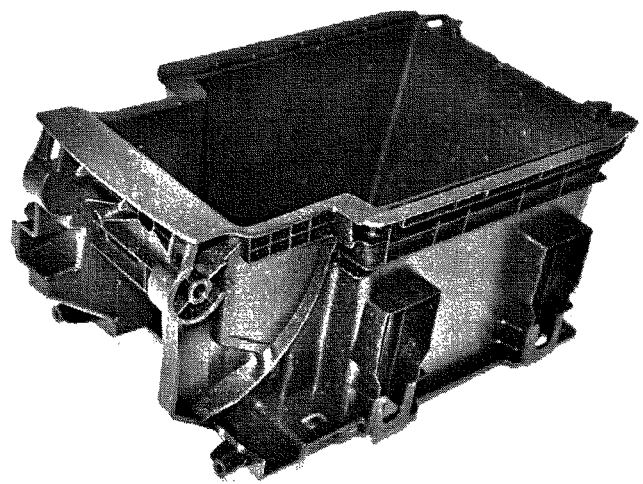
Figure 5:
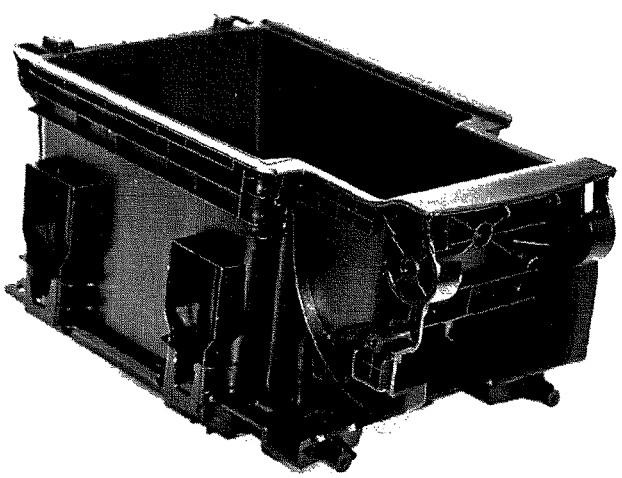
Figure 6:
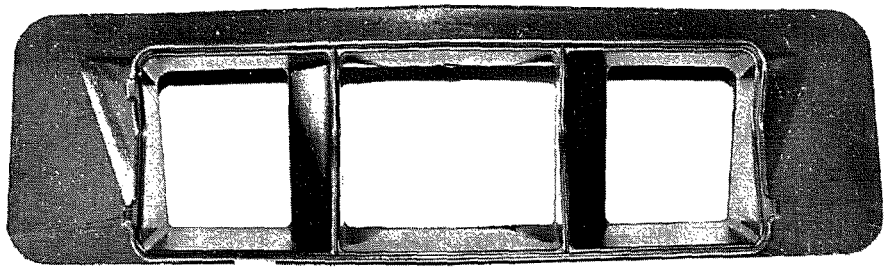
FIGS. 6 and 7 are prototypes for an air duct controller manufactured with optimized formulations.
Figure 7:
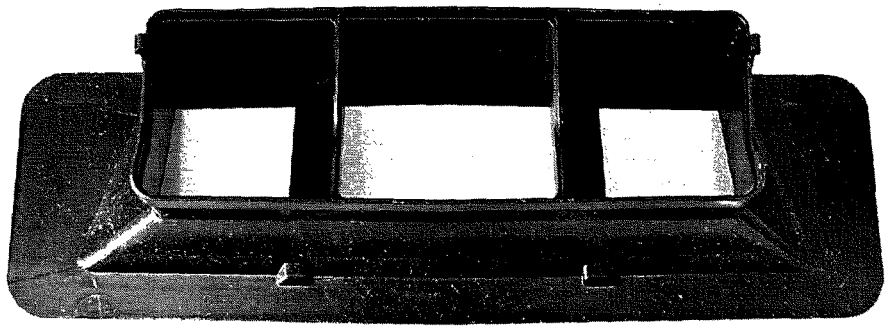
Figure 8:
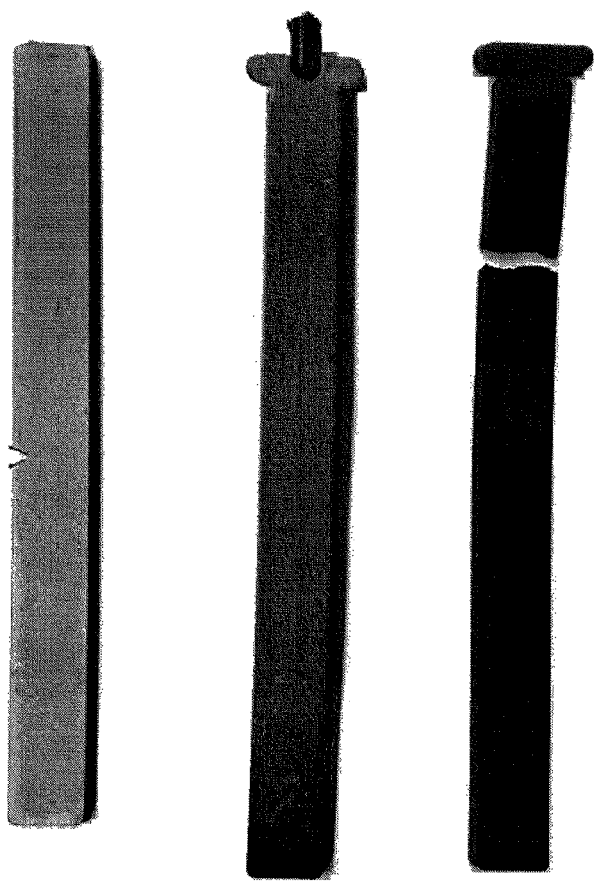
FIG. 8 shows test for aging temperature for different composites. Hybrids containing a combination of natural fiber-biochar (hybrid 1) present better performance in aging tests compared to those filled solely with biochar (hybrid 2).

"Composite", as used herein, generally means a combination of two or more distinct materials, each of which retains its own distinctive properties, to create a new material with properties that cannot be achieved by any of the components acting alone.

"Biochar", as used herein, refers to the material derived from the pyrolysis of biomass, such as plant fibers, agricultural/forest biomass, post industrial food-waste such as coffee chaff, municipal solid waste (MSW), and/or animal/bird manures, and has been treated and/or modified for use.

"Torrefied", as used herein, refers to the material derived from mild pyrolysis (e.g., 200-300° C.) of biomass, such as the types of biomass described above.

"Natural material", as described herein, refers to materials derived from plant natural sources such as grasses or trees.

"Synthetic fiber", referred in this document as glass fiber and carbon fiber.

"Synthetic plastic", as used herein, refers to a plastic prepared, at least in part, by human intervention, i.e., semi-synthetically or synthetically. "Synthetic plastics" also include recycled plastics.

"Thermoplastic", as used herein, refers to a material, such as a polymer, which softens (e.g., becomes moldable or pliable) when heated and hardens when cooled.

"Melt flow index" or "MFI", as used herein, refers to the measurement of the flow of the melt of a thermoplastic polymer. It is defined as the mass of polymer, in grams, flowing in ten minutes through a capillary of a specific diameter and length by a pressure applied via prescribed alternative gravimetric weights for alternative prescribed temperatures. The method is described in the standard ASTM D1238-13 and similar.

"Mechanical, physical, and thermal properties", as used herein, refers to tensile and flexural properties, impact strength, density, and heat deflection temperature (HDT). Methods that can be used to assess the performance of plastics are described in the following standards:

a) ASTM standard D638-10; Standard Test Method for Tensile Properties of Plastics (www.astm.org).

b) ASTM standard D-790-10; Standard Test Method for Flexural Properties of Unreinforced and Reinforced Plastics and Electrical Insulating Materials (www.astm.org).

c) ASTM standard D256-10: Standard Test Methods for Determining the Izod Pendulum Impact Resistance of Plastics (www.astm.org).

d) ASTM standard D4812-11; Standard Test Method for Unnotched Cantilever Beam Impact Resistance of Plastics (www.astm.org).

e) ASTM standard D648-07; Standard Test Method for Deflection Temperature of Plastics Under Flexural Load in the Edgewise Position (www.astm.org)

f) ASTM standard D792-13, Standard Test Methods for Density and Specific Gravity (Relative Density) of Plastics by Displacement (www.astm.org), g) Other standards may be follow as ASTM standard D618-13. Standard Practice for Conditioning Plastics for Testing (www.astm.org), h) When not specified, other certifications and/or standards can be used and adopted.

i) Aging resistance is a property in which a material is subjected to a relatively high temperature for plastics during certain period of time normally at +150° C. for 400 hours.

II. Composites

Composites as described herein may containing one or more synthetic plastics, such as one or more thermoplastics, one or more synthetic fibers, one or more natural materials, such as plant fibers, tree fibers, etc. and biochar and/or torrefied materials, are described herein. The composites can contain additional additives and reinforcing agents such as synthetic fibers, compatibilizers, impact modifiers, heat stabilizers, fillers, etc.

The composites show properties able to reach industrial specifications as detailed hereafter. The presence of the biochar and/or torrefied material also serves to remove or reduce odors often associated with synthetic plastics as well as those linked to natural fibers in fiber plastic composites. This is particularly important for plastics used in injection molded auto parts, e.g., console boxes, glove boxes, dash boards, car pillars, etc., and similar. The composites described herein are renewable-based since the composites contain 1.5 to 15 wt %, 15 to 20 wt %, or 20 to 26 wt % of biomass in the form of biochar, it may also contain 10 to 20 wt %, 20 to 40 wt %, or more biomass in the form of natural fibers yet demonstrate the necessary physical and/or mechanical properties for the applications listed above.

A. Synthetic Plastics and/or additives

The composites as described herein may contain one or more synthetic plastics. The synthetic plastic can be a thermoplastic. These materials can be used to modify specific mechanical or thermal properties of the composite.

Exemplary thermoplastics include, but are not limited to, polyolefin, such as polyethylene (PE), crosslinked-polyethylene (PEX), homopolymer polypropylene (PP), co-polymer polypropylene (co-PP) and/or high impact polypropylene, and polybutylene (PB); polyvinylchloride (PVC), chlorinated polyvinyl chloride (CPVC), polyvinylidene fluoride (PVDF), polystyrene (PS), acrylic polymers, nylon, acrylonitrile butadiene styrene, thermoplastic polyurethanes, polycarbonates, or combinations thereof. The concentration of the synthetic plastic can be from about 50 to 70 wt %.

The concentration of coupling agents grafted to maleic anhydride (MA-g-PP) can be from 1 to 7 wt % of the total composition. The percentage of maleation in the PP-g-MA is from 1 to 3 wt % or higher. The percentage of maleation may affect the molecular weight of PP-g-MA, and therefore, the functional behavior of the composites. Maleic anhydride grafted polyethylene (MA-g-PE) and maleic anhydride grafted linear low density polyethylene (MA-g-LLDPE) variations and similar may be used. Higher or lower molecular weight maleic anhydride grafted coupling agents may be used in various concentrations as a compatibilizers. These materials are used since the extrusion of cellulosic fibers and maleic anhydride grafted polypropylene (PP-g-MA) induces formation of ester bonds between OH groups on the fibers.

In particular embodiments, the synthetic plastic have a melting points or processing windows of less than about 200° C., such as about 165° C. to about 190° C. In some embodiments, the synthetic plastics are polypropylene, such as copolymer polypropylene (co-PP) or homopolymer polypropylene or combinations thereof.

B. Natural Fibers

The composites described herein also contain one or more natural fibers, such as plant fibers and/or tree fibers. "Natural materials", as used herein, are those derived from plants/trees. Materials used directly from plants are those such as fibers and particulate materials known as plant parenchyma. Depending on the process and final application, plant fibers can be extracted from lignocellulosics using bacteria and fungi, mechanical, or chemical methods. Mechanical processes for fiber/particle production are fast and economically viable for plastic fiber composites. The plant derived materials can be used to modify various properties of the composite, such as modulus (rigidity), heat deflection temperature, impact resistance, etc.

In some embodiments, the one or more plant derived materials are used in their as-received form, in which the polysaccharides e.g., cellulose, hemicellulose), lignin, waxes, and other components are intact and have not been degraded and/or chemically modified or are minimally chemically modified.

In other embodiments, the one or more plant derived materials are modified by physical or chemical means.

Exemplary natural materials include, but are not limited to, cotton, cotton stalks, jute, kenaf (e.g, bark, core, whole), miscanthus, reed, switch grass, flax, hemp, ramie, sisal, coir, talipot palm, pineapple, softwood kraft, olive tree (e.g., prunings), almond tree (e.g., prunings), corn husks and corn stovers, bagasse, banana, wheat straw, rice straw, oat hulls, sorghum straw, barley straw, and viscose (e.g., cord).

The morphology and chemistry of natural fibers and/or derived biochar/torrefied material influence the final properties of any composite. In plant fibers the microfibrilar angle influences drastically the performance of the composite. The crystalline structure, microfibrilar angle, and mechanical properties of specific sources of plant fibers are shown in Table 1. Table 2 shows the basic chemical composition of plant fibers.

TABLE 1

Morphology of plant fibers

| Fiber | Crystallinity (%) | Fibril Angle (°) | Density (g/cm$^3$) | Length(mm)/ Diameter(μm) | Elongation (%) | Tensile strength (MPa)//tenacity (g-force/dernier) | Young's modulus (GPa) |
|---|---|---|---|---|---|---|---|
| Cotton | — | — | 1.5-1.6 | — | 3.0-10.0 | 287-800/NR | 5.5-12.6 |
| Cotton stalks | — | — | — | 0.8/20 | — | — | — |
| Jute | — | 8 | 1.3-1.5 | 2.3/12-200 | 1.5-1.8 7.0-8.0 | 226-800/NR | 10-30 |
| Kenaf (bark) | — | — | — | 2.5/22 | — | — | — |
| Kenaf (core) | — | — | — | 0.8/22 | — | — | — |
| Kenaf (whole) | — | — | — | 1.3/22 | — | — | — |

TABLE 1-continued

Morphology of plant fibers

| Fiber | Crystallinity (%) | Fibril Angle (°) | Density (g/cm³) | Length(mm)/ Diameter(μm) | Elongation (%) | Tensile strength (MPa)//tenacity (g-force/dernier) | Young's modulus (GPa) |
|---|---|---|---|---|---|---|---|
| *Miscanthus* | — | — | — | 1.0/14 | — | — | — |
| Reed (internodes) | — | — | — | 1.2/17 | — | — | — |
| Reed (nodes) | — | — | — | 1.2/19 | — | — | — |
| Switch grass | — | — | — | 1.2/13 | — | — | — |
| Flax | — | 10 | 1.4-1.5 1.5-3.0 | 20/15-25 | 1.2-3.2 | 45-1500/NR | 27.6-80.0 |
| Hemp | — | 6-7 | 1.4 | 23/NR | 1.6 | 550-900/NR | 70.0 |
| Ramie | — | 7-8 | 1.5 | 154/NR | 1.2-3.8 | 220-938/NR | 44-128 |
| Sisal | — | 20 | 1.33-1.5 | 2.2/50-200 | 2.0-14 | 400-700/NR | 9-38 |
| Coir | 27-33 | 45 | 1.2 | 0.3-3.3/100-450 | 15.0-47.0 | 106-220/2.0 | 3-6 |
| Talipot palm | — | — | — | —/80-800 | 5.1 | 143-263/NR | 10-13 |
| Pineapple | 44-60 | 14 | — | 3-9/20-80 | 0.8-2.8 | 360-1627/0.7-3.8 | 24-83 |
| Olive tree (prunings) | — | — | — | 0.8/15 | — | — | — |
| Almond tree (prunings) | — | — | — | 0.8/13 | — | — | — |
| Corn husk | 48-50 | — | — | 0.5-1.5/10-20 | 12-12 | NR/2.0-3.0 | — |
| Bagasse | — | — | — | 0.8-2.8/10-34 | 5.5-11.8 | NR/0.9-1.25 | — |
| Banana | 45 | — | — | 0.9-4.0/80-250 | 1.0-3.7 | 700-780/2.4-3.7 | 27-32 |
| Wheat straw | 55-65 | — | — | 8.8/55-65 | — | — | — |
| Rice straw | 40 | — | — | 0.4-3.4/4-16 | — | — | — |
| Sorghum straw | — | — | — | 0.8-1.2/30-80 | — | — | — |
| Barley straw | — | — | — | 0.7-3.1/7-24 | — | — | — |
| Viscose (cord) | — | — | — | — | 11.4 | 593/NR | 11 |
| Soft-wood kraft | — | — | 1.5 | — | — | 1000/NR | 40 |
| E-glass [3] | — | — | 2.5 | NR/14 | 2.5-3.0 | 2000-3500/NR | 70 |
| S-glass [3] | — | — | 2.5 | — | 2.8 | 4570/NR | 86 |
| Aramide | — | — | 1.4 | — | 3.3-3.7 | 3000-3150/NR | 63.0-67 |
| Carbon | — | — | 1.4-1.7 1.8 | — | 1.4-1.8 | 4000/NR | 230-240 |

TABLE 2

Chemical properties of plant fibers

| Fiber | Cellulose(%) | Lignin(%) | Hemicellulose/ Pentosan(%) | Pectin(%) | Ash(%) | Wax (%) | Water solubles (%) |
|---|---|---|---|---|---|---|---|
| Bast fibers ||||||||
| Flax | 71 | 2.2 | 18-21 | 2.3 | — | 1.5 | 3.9 |
| Kenaf | 31-57 | 10-19 | 21-23 | — | 2-6 | — | 4 |
| Jute | 45-72 | 11-26 | 12-21 | 0.2 | 0.5-2 | 0.5 | 1.1 |
| Hemp | 57-77 | 3-13 | 14-23 | 0.1-0.9 | 0.8 | 0.8 | — |
| Ramie | 68-91 | 0.6-0.7 | 5-17 | 1.9 | — | 0.3 | 5.5 |
| Bast core fibers ||||||||
| Kenaf | 37-49 | 15-21 | 18-24 | — | 2-4 | — | — |
| Jute | 41-48 | 21-24 | 18-22 | — | 0.8 | — | — |
| Leaf fibers ||||||||
| Abaca | 56-63 | 7-9 | 15-17 | — | 3 | — | — |
| Sisal | 47-78 | 7-12 | 10-24 | 10 0.8 | 0.6-1 | 0.3-2 | 1.2 |
| Henequen | 77.9 | 13.1 | 4-8 | — | — | — | — |
| Pineapple | 70-82 | 5-12 | 18 | — | 0.7-0.9 | — | — |

TABLE 2-continued

Chemical properties of plant fibers

| Fiber | Cellulose(%) | Lignin(%) | Hemicellulose/Pentosan(%) | Pectin(%) | Ash(%) | Wax (%) | Water solubles (%) |
|---|---|---|---|---|---|---|---|
| Bast and core/straws/palms ||||||||
| Corn stover (stalk and leaves) | 38-40 | 7-21 | 28 | — | 3.6-7.0 | — | — |
| Coir | 36-43 | 41-45 | 0.15-0.25 | 3-4 | 2.2-10.2 | — | 5.25 |
| Bagasse (bast and core) | 32-48 | 23-32 | 19-24 | — | 1.5-5 | — | — |
| Banana(possible bast and core) | 60-65 | 5-10 | 6-8 | — | 4.7 | — | — |
| Wheat straw | 28-36 | 12-14 | 23-28 | — | 14-20 | — | — |
| Sorghum stalks | 27 | 11 | 25 | — | — | — | — |
| Barley straw | 31-45 | 14-19 | 27-38 | — | 2-7 | — | — |
| Flax (straw) | 43-47 | 21-23 | 16-26 | 1.8 | 5 | 1.5 | 3.9 |
| Reed (internodes) | 36 | 19 | | | 4.5 | | |
| Reed (nodes) | 32 | 19 | — | — | 5 | — | — |
| *Miscanthus* | 42 | 28 | — | — | 2 | — | — |
| Switchgrass | 42 | | | | | | |
| Cotton stalks | 42 | 15 | — | — | 4 | — | — |
| Talipot palm | 68 | 28 | — | — | — | — | — |
| Others (hair seeds) ||||||||
| Cotton | 82.7 | — | 5.7 | 5.7 | — | 0.6 | 1.0 |
| Wood fibers ||||||||
| Olive tree (prunings) | 40 | 19 | — | — | 2 | — | — |
| Almond tree (prunings) | 40 | 26 | — | — | 2.5 | — | — |

The concentration of the one or more natural materials in the composite may vary. However, it is desirable to maximize the concentration of plant derived materials to increase the renewability and decrease the cost. In some embodiments, the concentration of the one or more natural materials is from about 5% to about 50%, preferably 10% to about 50%, more preferably from about 15% to about 50%, even more preferably from about 20% to about 40%, most preferably from about 25% to about 35% by weight. In particular embodiments, it is from about 30% to about 40% by weight. In other embodiments, the concentration is from about 30% to about 35% but can be as low as about 5% or as high as 50% by weight, provided the ratio of natural fiber to biochar is optimized.

In some embodiments, the one or more natural materials are in the form of fibers or particles. The fibers can be any length. Traditionally, longer fibers are preferred since the resulting composites typically exhibited improved properties. For some industrial applications shorter fiber lengths (e.g., 1-4 mm, preferably about 2 mm) may be used which may prevent processing related problems, while maintaining and improving the properties of the composite. For example, short fiber lengths resulted in excellent dispersibility and improved properties compared to the use of longer fibers. In some embodiments described therein, shorter fiber lengths, e.g., 1-4 mm are used, preferably 2-6, or larger if the fiber is being previously chemically or physically treated.

C. Biochar Which Has Been Modified/Treated for Use and/or Torrefied Materials

The composites described herein also contain biochar and/or torrefied materials. Biochar is a material introduced as reactive filler in the composites described herein. It is renewable, of low cost (approximately $0.20 per pound) and light weight compared with other fillers such as talc or calcium carbonate.

Due to the abundance of biomass the possibilities to generate inexpensive biochar are enormous. This is especially true for residues generated from industrial food processing such as coffee chaff, coffee ground, spent tea ground, etc. In some embodiments, the biochar and/or torrefied biomass may be derived from the same materials as the natural material in the composite. For example, the composite may contain miscanthus fiber and biochar derived from miscanthus fiber or switchgrass and the respective derived biochar. In other embodiments, the natural material and biochar are different materials, i.e., miscanthus fiber-coffee chaff derived biochar. Biochar can be used as received or can be modified, grounded and/or classified by particle size prior to use. Examples of materials used to produce biochar include, but are not limited to, the materials in Table 1 as well as other plant/tree fibers, agricultural/forest biomass, municipal solid waste (MSW), food processing residues, and/or animal/bird manures.

The concentration of the biochar and/or torrefied material is typically from about 2% to about 40%, preferably from about 2% to about 30%, more preferably from about 2% to about 20%, most preferably from about 10% to about 20%. In other embodiments, the concentration of biochar can be as high as 30%, such as about 1.5% to about 30%, preferably about 1.5% to about 25%, more preferably about 1.5% to about 20%, more preferably about 1.5% to about 15%, most preferably about 5% to about 15%. In particular embodiments, the concentration is about 1.5%, 5%, 9%, 12% or 16%.

D. Other Additives and Processes

The composites can further contain one or more additional additives, such as reinforcing agents, compatibilizers, plasticizers, impact modifiers, etc.

Exemplary additives include, but are not limited to vinyl acrylate as functional groups, ester methacrylate as functional groups, anhydride as functional groups, etc, functionalized glycidyl methacrylate copolymers of ethylene methyl methacrylate as per example ethylene acrylic ester and glycidyl methacrylate and those similar. Inorganic fillers, such as talc, calcium carbonate, and/or clay and organic fillers, such as wood particles and plant parenchyma tissue can also be used. Since plant fibers tend to reduce the melt flow index of the composite, some additives are used to modify this property in such a way that the melt flow properties of the blend and the flow properties during the injection molding process are substantially improved again keeping the desired properties of the composites. Practical applications of catalytic amounts in the herein described compositions of dicumyl peroxide (DCP), di(tert-butylperoxyisopropyl)benzene and/or the similar such as a master batches in which the active chemical is one of the herein described, show the increase of MFI without drastically losing the overall performance. Those versed in the art of composites manufacture are familiar with the challenges to balance dissimilar properties such as stiffness, impact resistance, melt flow index, density, etc.

The composites may contain glass fiber or carbon fiber or other synthetic fibers such as Kevlar in ratios varying from 2 to 15 weight percent (wt %) of the total mass of the composition, or more preferably from 2 to 10 wt %, since these percentages can give optimum performance without diminishing the load of natural materials yet maximizing their effect in the cost-performance of the composite.

Particle size of biochar can be controlled to certain extent by grinding, or by using specific milling industrial instruments followed by separation technology. Different fractions or particle size distributions; and depending on the overall composition of the composite, can yield improved performance. In some embodiments described herein different fractions were obtained being those 425-200 µm, 200-150 µm, 150-75 µm, but more preferably lower than 75 µm. The overall results may show improved performance, enhancement of black color or a combination thereof.

III. Methods of Manufacture

The reaction/preparation of molten polymers can be performed on micro-compounders with integrated extrusion and injection molding systems (i.e., DSM micro-injection molding), or in any conventional extruder normally used to process and blend different thermoplastic polymers and/or materials followed by injection molding. Twin screw extruders are normally used to mix different thermoplastics and/or fillers in a process called compounding. The properties of the materials may vary according to the instruments used (i.e., length of the screws and configuration) and conditions of processing (temperature, motor speed, feed rate, etc.). An optimization of processing can be accordingly performed.

The basic construction of an extruder used to process bio-based materials is shown in FIG. 1. The extruder may contain a variable number of heating zones, for example, 10 heating zones or more, or less than 10 zones. It may require a degassing pump if a reactive extrusion is performed or if moisture or other vapors have to be extracted from the reactive chamber. The extruder typically has two feed barrel zones for introducing the polymers, the biochar, and fibers. In some embodiments, the matrix or thermoplastics are fed first in order to avoid obstructions. Once the matrix is running, the fiber/biochar is fed to the extruder simultaneously along with other additives still keeping the addition of the ingredients to the desired weight ratio. The fiber may be premixed with the powdered "biochar" before feeding in to the extruder. The processing temperatures may vary from 170 to 200° C., although, 180° C. with variations of 5° C. is recommended. The process schematic is shown in FIG. 1.

Tensile bars, impact specimens and other samples were manufactured either by using the injection molding machine Arburg ALLROUNDER 370 S, Germany, with a capacity of 77 tons or by using micro-injection molding instruments (i.e., DSM Explore. Netherlands). Other compounding instruments may be used to produce samples with similar results.

IV. Composite Compositions and/or Formulations

The composites described herein can be used to prepare an article of manufacture that is made from plastics and or plastic/synthetic fillers and fibers. Examples include but are not limited to, injection molded articles, such as car parts, and consumer products. Some exemplary illustrations are shown in FIGS. 3 to 7.

The composites described herein may use plant fibers as-received, without the need for modification/processing, containing the full complement of polysaccharides (e.g., cellulose, hemicellulose), lignin, waxes, and other components to produce a fiber-plastic composite in a one-step preparation method. The plant fiber used may be modified prior to its use in the composites. In some embodiments exemplary examples showed a case of alkali treated fiber. The components of the composite; polymer ratio, biomass ratio, impact modifiers, additives, etc., can be selected to modify one or more of the following criteria:

Rigidity/Modulus
Strength (tensile/flexural)
Impact strength
Heat deflection temperature
Moldability/Melt flow index
Renewable resource-based
Cost The composites described herein exhibit improved physical and/or mechanical properties. For example, the composites described herein can have a melt flow index of 6, 8, 10, 12, 15, 18, 20, 22, 25, 28, 30, 32, 35 g/10 min, preferably from about 10 to about 25 g/10 min; a density of less than about 1.04, 1.03, 1.05, 1.06, 10.7 or 1.08 to 1.09; in other embodiments the density may be as low as 0.92, 0.93, 0.94, 0.95, 0.98 or less than 1 g/cm$^3$; the impact strength in Izod notched samples may be greater than about 30, 35, 40, 45, 50, 55, 60, 65, 70, 75, 80, 85, 90, 95, or greater than 100 J/m; the impact strength in unnotched samples may be greater than 100, 200, 300, or more preferably more than 400 J/m; the tensile yield strength of greater than about 28, 30, 32, 35, 36 MPa or greater; the heat deflection temperature higher than 100, or greater than 140° C., preferably between about 100° C. and 140° C. A balance in properties is recommended as the objective of this development is targeted to satisfy industrial practices as explained thereafter. It is well known in the art of polymers and composite materials that the impact resistance may show high variations from unnotched to notched samples and that a balance in these tests is fundamental.

EXAMPLES

Composite materials containing one or more sources of plant derived materials and/or biomass, and biochar and/or torrefied materials, one or more sources of modified plant derived materials and/or biochar and/or torrefied materials, one or more sources of polyolefins were composed in order to exemplify the claims henceforth. Exemplary materials, not limited to these, are listed in Table 3. Examples in which biochar derived from different sources are provided in Table 4A and 4B. This table also includes compositions reinforced with glass fiber or carbon fiber as hybrid components in the composites.

TABLE 3

Materials used for exemplary compositions

| Materials | Chemical name |
|---|---|
| A | Co-poplymer polypropylene (co-PP) |
| B | Homopolymer polypropylene |
| C | Maleic anhydride grafted polypropylene (MA-g-PP) |
| D | Ethylene terpolymer |
| E | Ethylene-acrylic terpolymer |
| F | Glass fiber |
| G | Carbon fiber |
| H | Plant fibers different sources<br>MF = *miscanthus*,<br>SGF = switchgrass,<br>OHF = oat hull,<br>TMF = torrefied MF |
| I | Biochar exemplary sources but not limited to:<br>MB = *miscanthus* biochar<br>CCB = coffee chaff biochar |
| J | Phenolic antioxidants |
| K | Di(2-tert-butylperoxyisopropyl)benzene in Master Batch |
| L | Di(2-tert-butylperoxyisopropyl)benzene pure |
| M | Dicumyl peroxide |

TABLE 4-A

Exemplary compositions

| Examples | A | B | C | D | E | F | G | H | I | J | K | L | M | Comments |
|---|---|---|---|---|---|---|---|---|---|---|---|---|---|---|
| | | | | Wt % | | | | | | | phr | | | |
| 1 | 48 | 10 | 5 | — | 2 | — | — | 33.5 | 1.5 | — | 1.7 | — | — | MF(4 mm)-MB |
| 2 | 38 | 10 | 5 | — | 5 | — | — | 25 | 15 | — | 2 | — | — | MF(2 mm)-MB |
| 3 | 48 | 10 | 5 | — | 3 | — | — | 25 | 9 | — | 1.7 | — | — | TMF(4 mm)-MB |
| 4 | 48 | 10 | 5 | — | 3 | — | — | 25 | 9 | — | 1.7 | — | — | OHF(2-6 mm)-MB |
| 5 | 51 | 12 | 5 | — | 3 | — | — | 20 | 9 | — | 1.7 | — | — | SGF(6 mm)-MB |
| 6 | 49 | 20 | 3 | 5 | — | — | 3 | 10 | 10 | — | 1 | — | — | MF(2 mm)-MB |
| 7 | 38 | 25 | 3 | 2 | — | 5 | — | 15 | 12 | 0.15 | 0.5 | — | — | MF(4 mm)-MB (milled) |
| 8 | 38 | 25 | 3 | — | 2 | 5 | — | 15 | 12 | 0.15 | 0.5 | — | — | MF(4 mm)-MB (milled) |
| 9 | 39.5 | 25 | 3.5 | — | — | 5 | — | 18 | 9 | 0.15 | — | — | — | MF(2 mm)-MB (milled & sieved 15 μm>) |
| 10 | 39.5 | 25 | 3.5 | — | — | 5 | — | 18 | 9 | 0.15 | — | 0.15 | — | MF(2 mm)-MB (milled & sieved 15 μm>) |
| 11 | 39.5 | 25 | 3.5 | — | — | 5 | — | 27 | — | 0.15 | — | — | — | MF(4 mm) |
| 12 | 39.5 | 25 | 3.5 | — | — | 5 | — | — | 27 | 0.15 | — | — | — | MB (milled) |
| 13 | 39.5 | 25 | 3.5 | — | — | 5 | — | — | 27 | 0.15 | — | — | 0.05 | MB (milled) |
| 14 | 39.5 | 25 | 3.5 | — | — | 5 | — | 18 | 9 | 0.15 | — | 0.015 | — | MF(4 mm)-alkali treated |
| 15 | 39.5 | 25 | 3.5 | — | — | 5 | — | 18 | 9 | 0.15 | — | 0.015 | — | MF(4 mm)-CCB (milled & sieved 150 μm) |
| 16 | — | 64.5 | 3.5 | — | — | 5 | — | 18 | 9 | 0.15 | — | 0.015 | — | MF(4 mm)-MB(milled) |

TABLE 4-B

| Example No. | Stress at yield (MPa) | Tensile Mod (MPa) | Flex Stress (MPa) | Flex Mod (MPa) | Notched Izod Impact (J/m) | Density g/cm³ | MFI @230° C./2.16 kg (g/10 min) | HDT (° C.) | Unnotched Impact (J/m) |
|---|---|---|---|---|---|---|---|---|---|
| 1 | 30 ± 2 | 2400 ± 100 | 50 ± 2 | 2300 ± 100 | 50 ± 5 | ~1.020 | 18 ± 2 | >120 | >200 |
| 2 | 28 ± 1 | 2300 ± 100 | 45 ± 2 | 2300 ± 100 | 60 ± 5 | ~1.040 | 15 ± 2 | >130 | >250 |
| 3 | 26 ± 2 | 2300 ± 100 | 45 ± 2 | 2200 ± 100 | 40 ± 5 | ~1.030 | 20 ± 2 | >120 | >200 |
| 4 | 26 ± 2 | 2000 ± 100 | 45 ± 2 | 1900 ± 100 | 50 ± 5 | ~1.030 | 15 ± 2 | >120 | >200 |
| 5 | 26 ± 2 | 1800 ± 100 | 40 ± 2 | 1700 ± 100 | 50 ± 5 | ~1.010 | 15 ± 2 | >120 | >200 |
| 6 | 33 ± 2 | 3000 ± 100 | 50 ± 2 | 2400 ± 100 | 70 ± 5 | ~0.980 | 20 ± 2 | >120 | >300 |
| 7 | 30 ± 1 | 3040 ± 100 | 55 ± 2 | 2500 ± 100 | 60 ± 10 | ~1.013 | 13 ± 1 | >130 | >350 |
| 8 | 30 ± 1 | 3000 ± 100 | 50 ± 2 | 2300 ± 100 | 50 ± 5 | ~1.014 | 14 ± 1 | >130 | >400 |
| 9 | 32 ± 2 | 3500 ± 70 | 60 ± 2 | 2700 ± 100 | 50 ± 2 | ~1.039 | 12 ± 1 | >140 | >350 |
| 10 | 32 ± 2 | 3400 ± 100 | 59 ± 2 | 2700 ± 100 | 53 ± 2 | ~1.038 | 16 ± 1 | >140 | >330 |
| 11 | 32 ± 1 | 3370 ± 108 | 62 ± 2 | 2914 ± 32 | 64 ± 5 | ~1.035 | 10 ± 1 | >140 | 368 ± 30 |
| 12 | 31 ± 0.3 | 2410 ± 150 | 60 ± 2 | 2263 ± 90 | 40 ± 8 | ~1.035 | 12 ± 1 | >130 | 543 ± 36 |
| 13 | 32 ± 0.5 | 2380 ± 86 | 59 ± 1.5 | 2203 ± 20 | 41 ± 6 | ~1.035 | 20 ± 2 | >135 | 416 ± 55 |
| 14 | 35 ± 1 | 3350 ± 100 | 60 ± 2 | 2600 ± 50 | 55 ± 2 | ~1.039 | 13 ± 1 | >130 | 367 ± 20 |
| 15 | 30 ± 0.5 | 3440 ± 73 | 56 ± 0.5 | 2780 ± 62 | 44 ± 3 | 1.042 | 15 ± 1 | 133 | 289 ± 20 |
| 16 | 41 ± 1 | 3820 ± 54 | 75 ± 1 | 3080 ± 100 | 25 ± 1 | 1.039 | 22 ± 1 | >130 | 297 ± 35 |

Unless defined otherwise, all technical and scientific terms used herein have the same meanings as commonly understood by one of those skilled in the art to which the disclosed invention belongs.

Those skilled in the art of manufacture of composite materials will recognize, or be able to ascertain using no more than routine experimentation, many equivalents to the specific embodiments of the invention described herein. Such equivalents are intended to be encompassed by the following claims.

We claim:

1. A composite comprising one or more synthetic plastics, one or more synthetic fibers, and a biochar and/or torrefied material, wherein the one or more synthetic fibers comprise glass fiber or carbon fiber.

2. The composite of claim 1, wherein the one or more synthetic plastics comprise thermoplastics.

3. The composite of claim 2, wherein the concentration of the one or more synthetic fibers is from about 2% to about 15% by weight.

4. The composition of claim 2, wherein the one or more synthetic plastics are polyolefins.

5. The composite of claim 4, wherein the one or more polyolefins is polypropylene.

6. The composite of claim 4, wherein the one or more polyolefins is homopolymer polypropylene, or co-polymer polypropylene.

7. The composite of claim 2, wherein the one or more synthetic plastics is polyvinyl chloride.

8. The composite of claim 2, wherein the one or more synthetic plastics is polystyrene.

9. The composite of claim 1, wherein the composite further comprises one or more natural materials.

10. The composite of claim 9, wherein the one or more natural materials is a plant fiber selected from the group of fibers consisting of: cotton, cotton stalks, jute, kenaf, miscanthus, reed, switch grass, flax, hemp, ramie, sisal, coir, talipot palm, pineapple, olive tree, almond tree, corn husk, corn stovers, bagasse, banana, wheat straw, rice straw, oat hulls, sorghum straw, barley straw, viscose, and soft-wood kraft.

11. The composite of claim 10, wherein the concentration of the plant fiber is from about 5% to about 50% by weight.

12. The composite of claim 1, wherein the concentration of the biochar and/or torrefied material is from about 2% to about 20% by weight.

13. The composite of claim 1, wherein the composite further comprises one or more additional reinforcing agents, compatibilizers, or a combination of reinforcing agents and compatibilizers.

14. The composite of claim 1, wherein the composite further comprises one or more of the following materials selected from the group consisting of impact modifiers, maleate-derived polyolefins, organic fillers, and inorganic fillers.

15. The composite of claim 14, wherein the inorganic fillers are selected from the group consisting of talc, calcium carbonate, clay, plant-derived materials and combinations thereof.

16. The composite of claim 1, wherein the density of the composite is less than 1.07 $g/cm^3$.

17. The composite of claim 1, wherein the melt flow index of the composite is at least about 10 to 75 g/10 min.

18. The composite of claim 1, wherein the composite is devoid of carbon black, talc or both carbon black and talc.

19. The composite of claim 1, wherein the one or more synthetic plastics include recycled synthetic plastics produced from municipal solid waste.

20. A method of making the composite of claim 1, the method comprising co-extruding the one or more synthetic plastics with the one or more synthetic fibers and the biochar and/or torrefied material.

21. The method of claim 20, wherein the one or more synthetic plastics are fed into the extruder through a first feed arm and the one or more synthetic fibers and the biochar and/or torrefied material are fed into the extruder through a second feed arm.

22. An article of manufacture comprising the composite of claim 1.

23. The article of claim 22, wherein the article is an auto part.

24. The article of claim 22, wherein the article is a building material.

25. The article of claim 22, wherein the article is a consumer product.

26. The composite of claim 1, wherein the composites include impact modifiers, wherein the impact modifier is selected from the group consisting of: ethylene terpolymer, ethylene-acrylic ester-glycidyl methacrylateterpolymer and a combination thereof.

* * * * *